No. 788,911. PATENTED MAY 2, 1905.
S. H. JONES.
SEEDING MACHINE.
APPLICATION FILED JAN. 30, 1905.
2 SHEETS—SHEET 1.
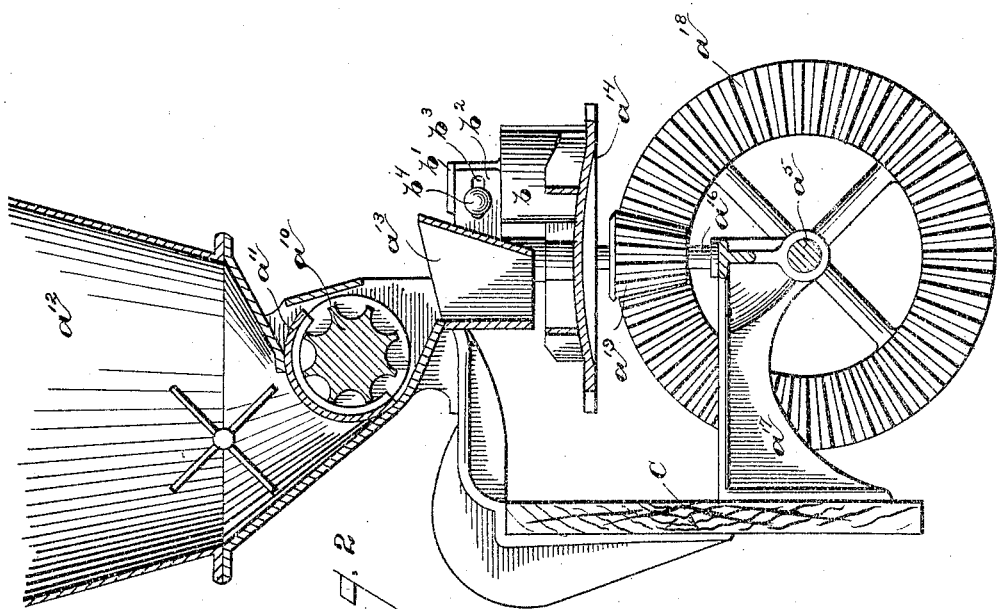
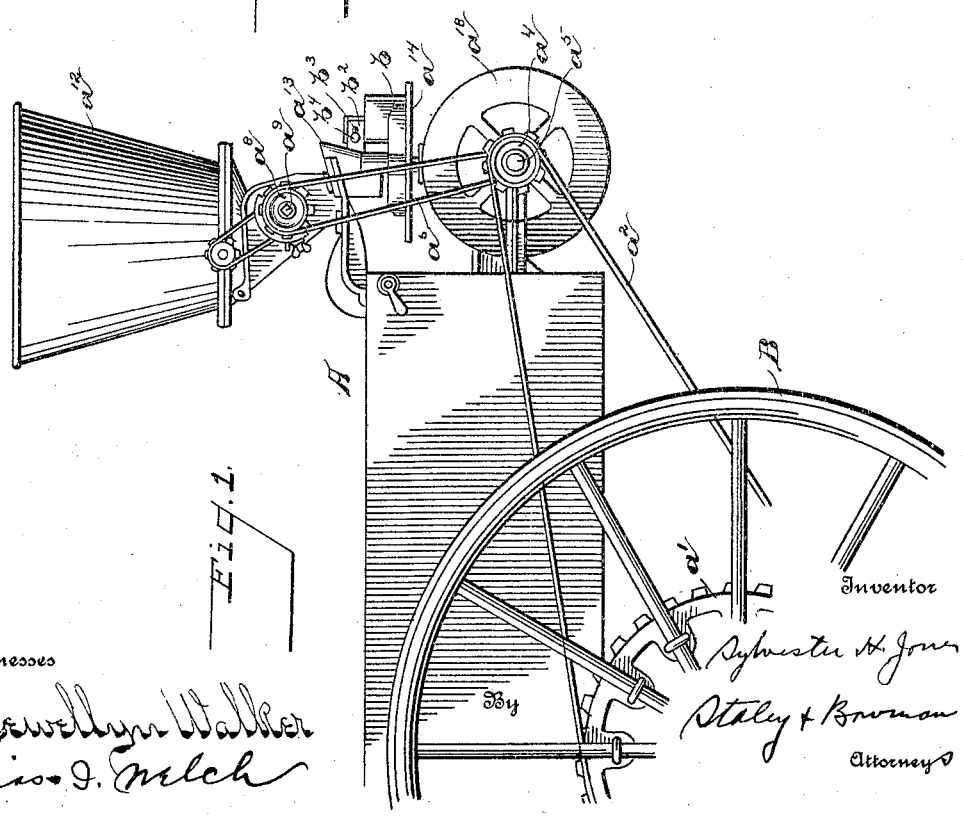
Witnesses
Inventor
Sylvester H. Jones
By Staley & Bowman
Attorneys

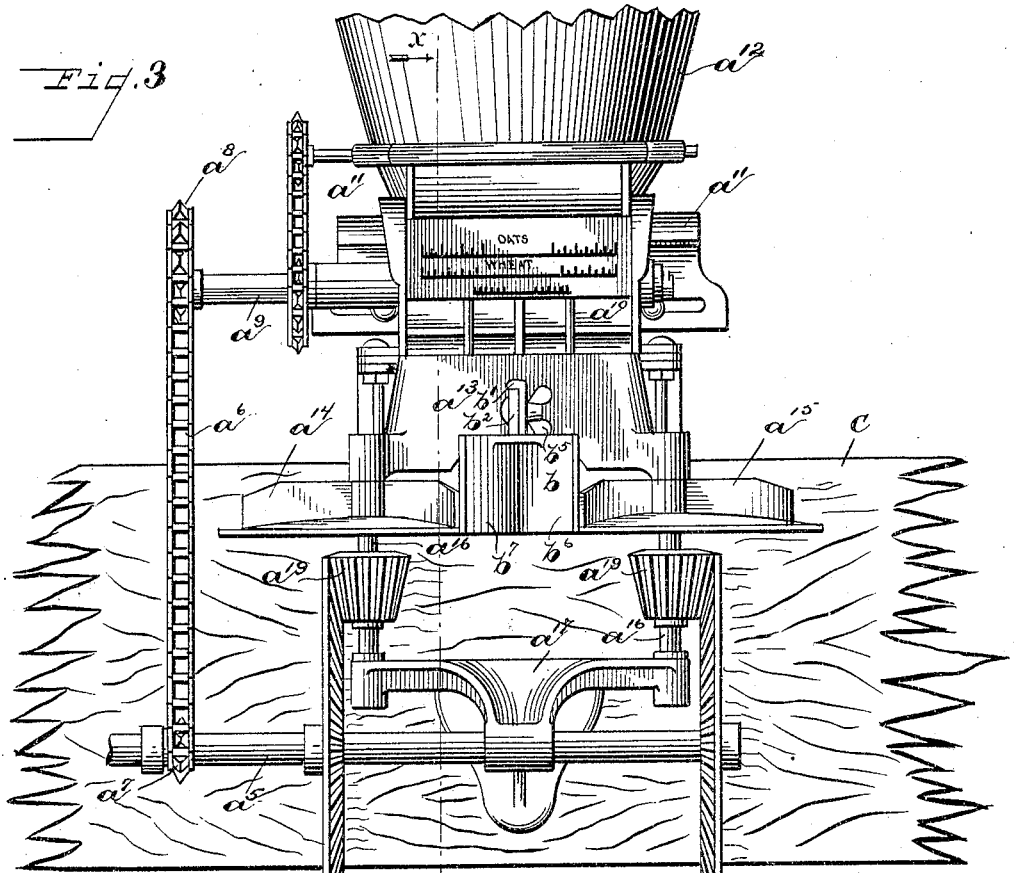
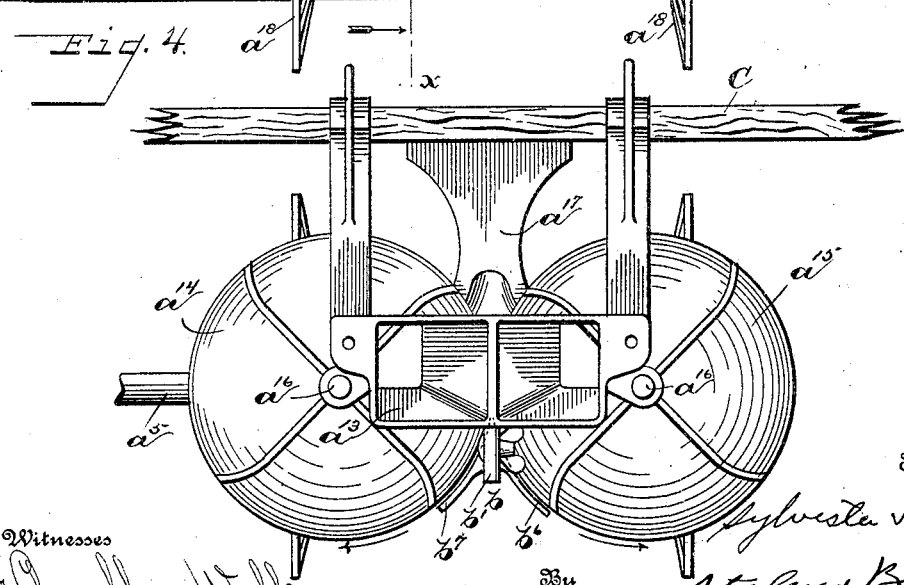

No. 788,911. Patented May 2, 1905.

UNITED STATES PATENT OFFICE.

SYLVESTER H. JONES, OF RICHMOND, INDIANA, ASSIGNOR TO AMERICAN SEEDING MACHINE COMPANY, OF JERSEY CITY, NEW JERSEY, A CORPORATION OF NEW JERSEY.

SEEDING-MACHINE.

SPECIFICATION forming part of Letters Patent No. 788,911, dated May 2, 1905.

Application filed January 30, 1905. Serial No. 243,446.

*To all whom it may concern:*

Be it known that I, SYLVESTER H. JONES, a citizen of the United States, residing at Richmond, in the county of Wayne and State of Indiana, have invented certain new and useful Improvements in Seeding-Machines, of which the following is a specification.

My invention relates to improvements in seeding-machines, and more particularly to that kind of machine generally known as "broadcast-seeders." It is adapted to be attached to the end-gate of an ordinary wagon-bed.

My improvement consists in the construction of a seeding-machine of the character specified which is adapted to make a more even and desirable scattering or cast of seed than any device previously known.

My object is to construct a seeding-machine having a regulator which will enable the operator of the machine readily to adjust the machine for variations in the speed of movement of the machine and in the kind of seed to be sown. It also enables the operator to provide for different conditions of sowing, so that the cast of seed will always be even and proper.

I have preferably shown a machine having a plurality of distributing-fans and a single regulator for said fans, which regulator can be adjusted to provide for the proper distributing of the grain by all said distributing-fans. I have preferably shown a plurality of feeding devices, there being one seeding device for each distributing-fan. Consequently by my improvement when one feeding device is shut off the machine will continue to cast the seed from the remaining device by means of one distributing-fan and will thereby diminish the breadth of the cast by about one-half.

In the drawings, Figure 1 is a side view of my device, showing the seeding adjustment on the rear of an ordinary wagon-bed. Fig. 2 is a vertical section taken on the line $xx$ of Fig. 3. Fig. 3 is a rear elevation of the device, and Fig. 4 is a plan view thereof.

Like letters of reference indicate like parts throughout said views.

In Fig. 1 I have shown a wagon-bed (indicated by reference-letter A) and the carrying-wheels of the wagon, (indicated by reference-letter B.) The end-gate of the bed of the machine is indicated by C, Fig. 3. The carrying-wheel B has secured to its spokes a sprocket-wheel $a'$. The sprocket-chain $a^2$, Fig. 1, connects with a wheel $a^4$. This wheel is rigidly secured to a shaft $a^5$. By means of the sprocket-chain $a^2$ the shaft $a^5$ is rotated by the wheel B. This shaft $a^5$ also has secured to it in proximity to wheel $a^4$ the sprocket-wheel $a^7$, which connects, by means of the sprocket-chain $a^6$, with a sprocket-wheel $a^8$, rigidly secured to shaft $a^9$. The shaft $a^9$ carries the feeding devices $a^{10}$, Fig. 2, and by means of the connection formed by the sprocket-chains $a^2$ and $a^6$ the said feeding devices are operated. These feeding devices are of the form of fluted feeding-wheels, as shown clearly in Fig. 2, and, as heretofore explained, there are two of these wheels securely fastened to said shaft $a^9$ and adapted to rotate with said shaft. I have shown a cut-off slide for each feed-wheel, (indicated by $a^{11}$.) The operator of the machine by moving these slides can cut off either or both feeding devices.

The seed is carried in a hopper $a^{12}$, and, as is common in all seeding devices of this character, it is adapted to flow through said hopper to the bottom thereof and to be carried by the feeding-wheels $a^{10}$ to a point where it drops into the supplemental hopper $a^{13}$, Fig. 2. From this supplemental hopper $a^{13}$ the seed passes to the distributing-fans $a^{14}$. In my improved machine the point where the grain is fed to the distributing-fan remains constant and does not vary for the conditions nor for the kind of grain. These distributing-fans $a^{14}$ and $a^{15}$, Fig. 3, are securely fastened to upright shafts $a^{16}$, and these shafts are supported by a support $a^{17}$, which support is journaled loosely on shaft $a^5$, so that said support also forms a bearing for said shaft $a^5$, and said support is secured to the end-gate C. Said support also forms bearings for the lower ends of the upright shafts $a^{16}$. The gear-wheels $a^{18}$ are secured to said shaft $a^5$ and are rotated by said shaft. These wheels mesh with gear $a^{19}$, securely journaled on said shaft $a^{16}$, so that the two shafts $a^{16}$ are rotated by said gear $a^{18}$ and $a^{19}$, and the distributing-fans $a^{14}$ and $a^{15}$ rotate in unison therewith. It is apparent that whenever the speed with which the horses or other motive power applied to the wagon or carrier for such distributer varies the speed of the distributing-fans $a^{14}$ and $a^{15}$ will change accordingly. It is also apparent that when the weight of the grain or the quality thereof varies the centrifugal force imparted to said grain as it is fed upon the distributing-fans will be varied. To provide for these contingencies and for other conditions, I have disclosed a single regulator $b$, which is common to both distributing-fans. This regulator is adjustable, and by means of it the operator can provide for change of speed in the movements of the machine, as well as change in the weight or quality of grain to be sown. In Fig. 2 I have shown the regulator adjusted for ordinary conditions—that is to say, for sowing wheat of average kind and quality weighing about sixty pounds to the bushel and with the machine being propelled at the rate of two and one-quarter miles per hour. The distributing-fans, Fig. 4, rotate in the direction indicated by the arrow.

It will be seen that the regulator $b$ is formed with a rib $b'$, which rests upon the edge of a rearwardly-projecting plate $b^2$. This plate $b^2$ projects from the side of a supplemental hopper $a^{13}$ and is formed with a slotted opening $b^3$. A bolt $b^4$ extends through an opening in said regulator $b$ and projects through the slotted opening $b^3$ and is adapted to clamp the regulator $b$ in proper adjustable position to the supported plate $b^2$ by means of the nut $b^5$. It will be apparent that the bolt $b^4$ is adjusted so that it is located near the forward end of the slotted opening $b^3$, (looking toward the front of the wagon.) If the speed of the machine should be increased, the bolt $b^3$ may be loosened by the nut $b^5$, Fig. 3, and the regulator $b$ can then be moved rearwardly and securely fastened in its adjusted position by tightening the nut $b^5$. If, however, the speed of the machine is decreased, the adjustment may be made by moving the regulator forward. There is an increasing demand for more accuracy or for a more equal distribution of grain or seed over the ground and for a cast that will be even and equal, and as the speed of the team affects both the width and evenness of the cast I find it necessary to provide a regulator which can be adjusted to the different team speeds. It is to be remembered that in machines of this character the machine is drawn back and forth across the field; but the center of the cast must be properly formed each time, while the sides of the cast may be increased in amount upon the return of the machine, for the sides overlap. In general, therefore, it is desirable that at the extreme sides the cast should be lighter than at the center, and my machine is adapted to provide for variations in the quality of the grain and the speed of machine, so that this relation will be maintained. I maintain a constant point of feed to the distributing-fans, and the adjustment is by means of the regulator, which is formed with deflecting-plates. As shown in Fig. 4, the deflecting-plates $b^6$ and $b^7$ conform in shape to the circumference of the distributing-fans. The result is that when the distributing-fans rotate and the grain is thrown by centrifugal force off the distributing-fans it strikes the concave surface of the deflecting-plates $b^6$ and $b^7$, and the amount of grain scattered at the center of the cast is thereby regulated. If the machine is running slow, the regulator, as heretofore explained, is moved forward so that the deflecting-plates are in close proximity to the distributing-fans, and the apex or forward edge of the regulator $b$ is adjusted nearer to the point of feed of the grain to the distributing-fans, and the deflecting-plates of the regulator prevent the dropping of too great a quantity of seed at the center of the cast.

Having thus described my invention, I claim—

1. In a seeding-machine, means for scattering radially the seed delivered from the said machine, and a regulating device for changing the path of movement of part of said seed after it is discharged from said first-mentioned means.

2. In a seeding-machine, the combination of a plurality of fans for scattering the seed delivered from said machine, and an adjustable regulating device coöperating with said fans to divert part of the seed from the path of movement given it by said fans, for the purpose specified.

3. In a seeding-machine, the combination of a plurality of distributing-fans, a regulator for said fans located intermediate to two of said fans, said fans being movable in substantially the same planes and adapted to throw the grain toward said regulator.

4. In a seeding-machine, the combination of a distributing-fan with a regulating device, located in proximity to the outward periphery of said fan, and having a deflecting-plate arranged to conform to the periphery of said fan.

5. In a seeding-machine, the combination of a plurality of distributing-fans with a regulating device intermediate said fans, said regulating device being formed with concave surfaces, one of said surfaces being arranged in close proximity to the periphery of the distributing-fans.

6. In a seeding-machine, the combination of a distributing-fan and a regulating device comprising a deflecting-plate, the two ends of said plate arranged substantially perpendicularly to the plane of said distributing-fans, and capable of adjustment, while maintaining the relative position of said ends with said plane.

7. In a seeding-machine, the combination of two distributing-fans with a regulating device formed with an apex and having two sides radiating from said apex, each side adapted to coöperate with a distributing-fan to deflect the grain thrown from said fan.

8. In a seeding-machine, the combination of a plurality of feeding devices and a cut-off device for each feeding device, a plurality of distributing-fans, said fans being located below said feeding devices, and means for deflecting the grain thrown from said distributing-fans, substantially as specified.

In testimony whereof I have hereunto set my hand this 24th day of January, A. D. 1905.

SYLVESTER H. JONES.

Witnesses:
CHARLIE H. ROSS,
ELMER E. TOWLE.